Feb. 26, 1946. T. J. R. BRIGHT 2,395,719
RECEPTION OR TRANSMISSION OF SOUND VIBRATIONS
Filed Dec. 4, 1942 4 Sheets-Sheet 1
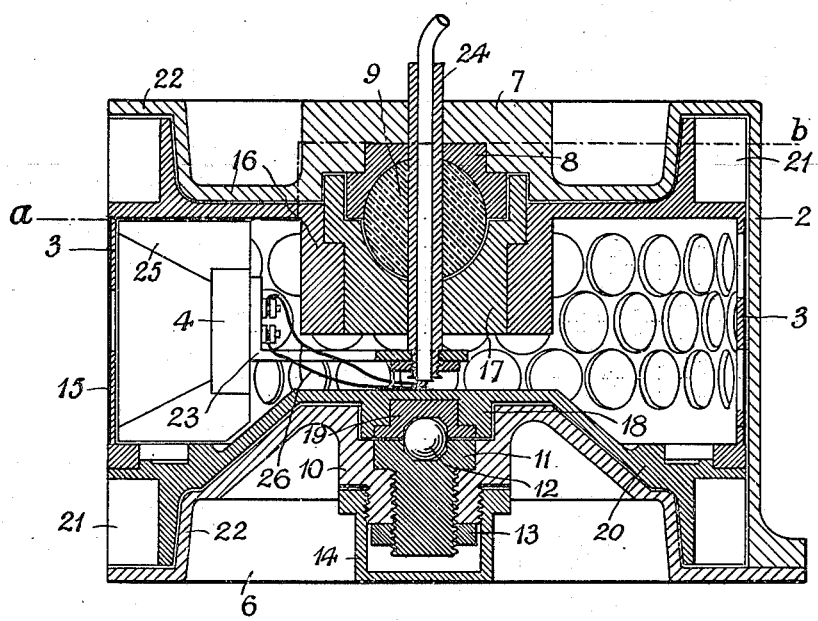
Fig: 1.
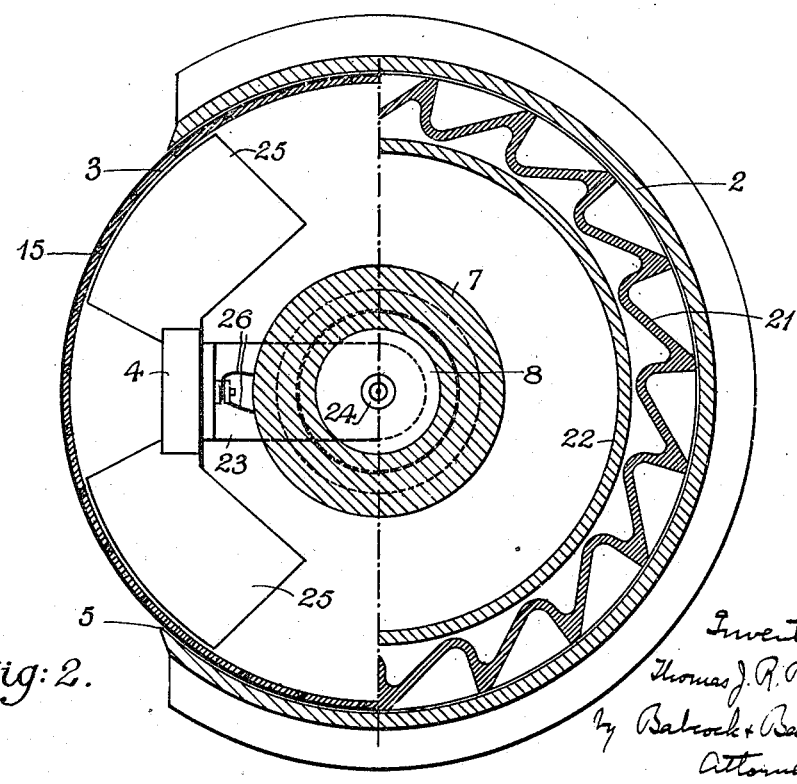
Fig: 2.

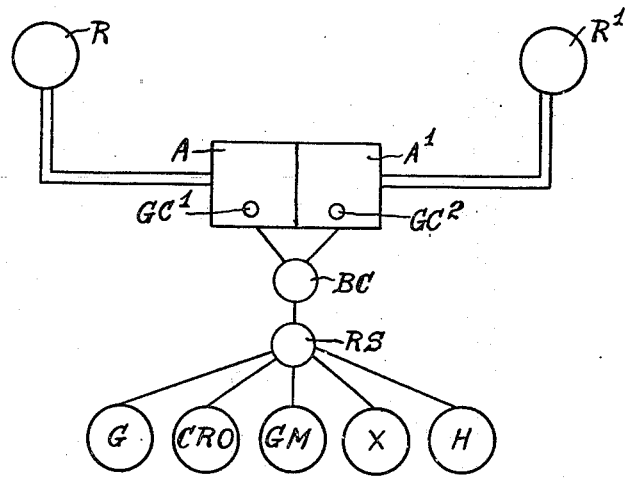
Fig:4.
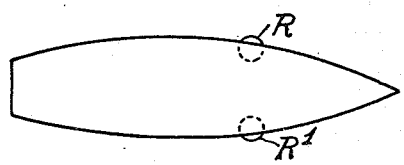
Fig:5.
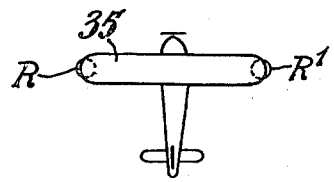
Fig:6.
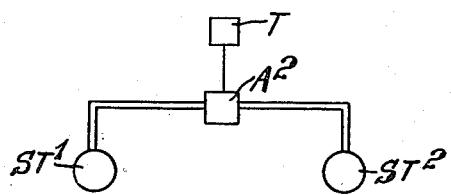
Fig:7.

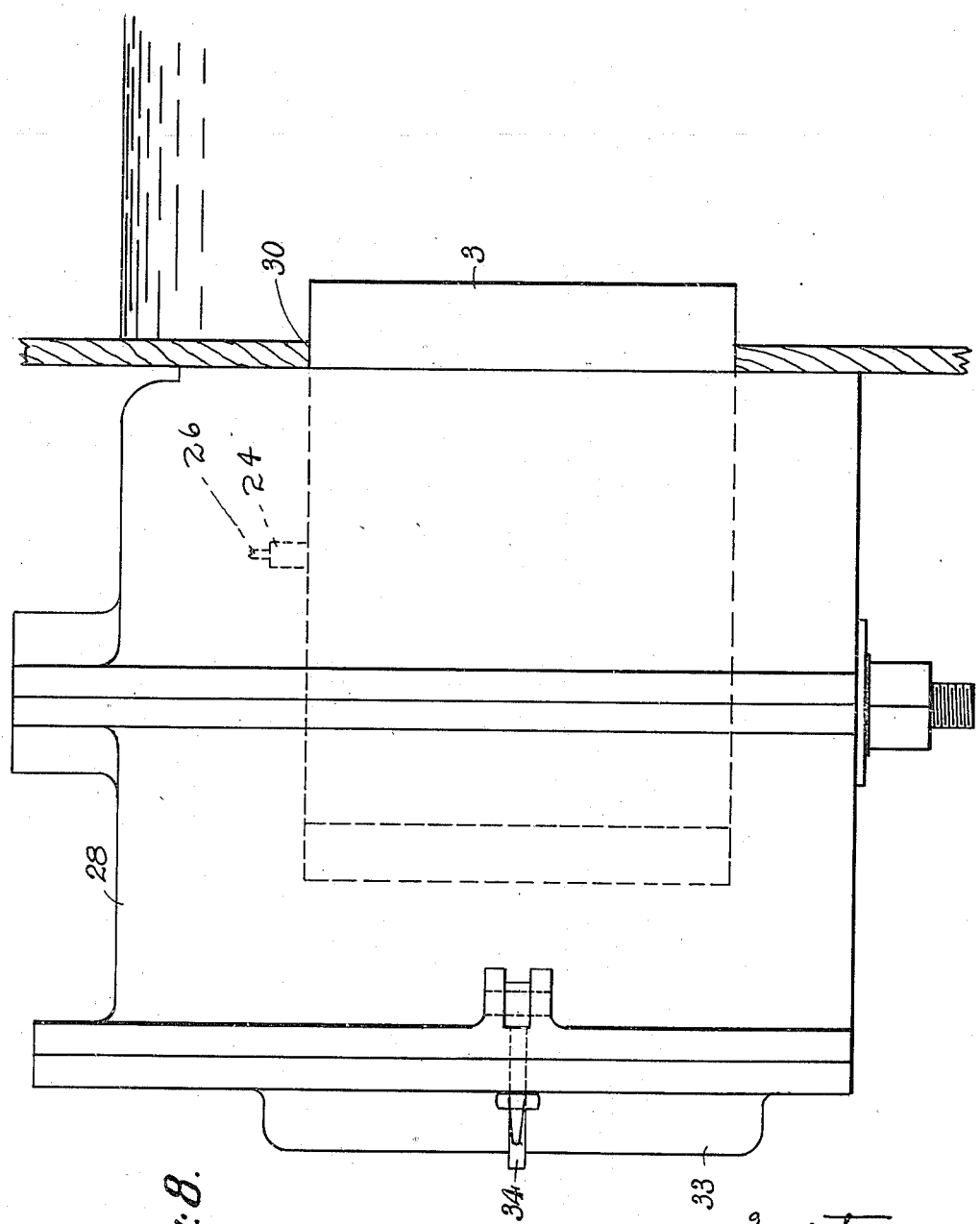

Patented Feb. 26, 1946

2,395,719

UNITED STATES PATENT OFFICE 2,395,719

RECEPTION OR TRANSMISSION OF SOUND VIBRATIONS

Thomas John Robert Bright, Coventry, England

Application December 4, 1942, Serial No. 467,914
In Great Britain December 20, 1941

6 Claims. (Cl. 181—31)

This invention relates to certain improvements in the reception or transmission of sound waves by or from objects between which and a surrounding fluid medium there is relative movement.

In such cases it is known that effective reception or transmission of sound waves is adversely affected by the local noises produced by or as the result of relative motion between the object and the fluid medium.

The object of the present invention is to improve the reception or the transmission, as the case may be, of sound waves under the conditions above referred to, by eliminating or reducing the interference or distortion caused by relative movement between the receiver or transmitter and the said fluid medium.

A further object of the invention is to utilize the reception of sound waves for the purpose of actuating or controlling ancillary devices of a varied character.

According to the present invention there is arranged between the fluid medium and one or more normally stationary sound receiving or transmitting devices on the object, a diaphragm, or a screen, having one or more openings or perforations and arranged to have movement relatively to said device or devices at a speed equal or approximately equal, but in the opposite direction, to the movement of the said object in the fluid medium, or alternatively, at the same or approximately the same speed and in the same direction as the fluid medium, according as to whether the object is moving in a relatively stationary fluid medium or is stationary in a relatively moving fluid medium.

The motion of the diaphragm or the screen can either be derived from the relative movement between the object and the fluid medium or from another source of power.

Where there are a number of sound receiving or transmitting devices they are arranged for angular adjustment for the purpose of determining the direction of the source of the received sound waves.

In the accompanying drawings,

Figure 1 is a view in axial plane section of one form of the improved apparatus.

Figure 2 is a transverse sectional view, on the line a—b of Figure 1.

Figure 4 illustrates diagrammatically a complete equipment for marine purposes.

Figure 5 is a diagram illustrating the general arrangement of the apparatus on a ship.

Figure 6 is a diagram illustrating one general arrangement of the apparatus on aircraft.

Figure 7 illustrates diagrammatically an equipment for sound transmission purposes.

Figure 8 illustrates a sea-valve secured below the water line in the side of a ship and with the sound receiving apparatus mounted therein.

Figure 3:
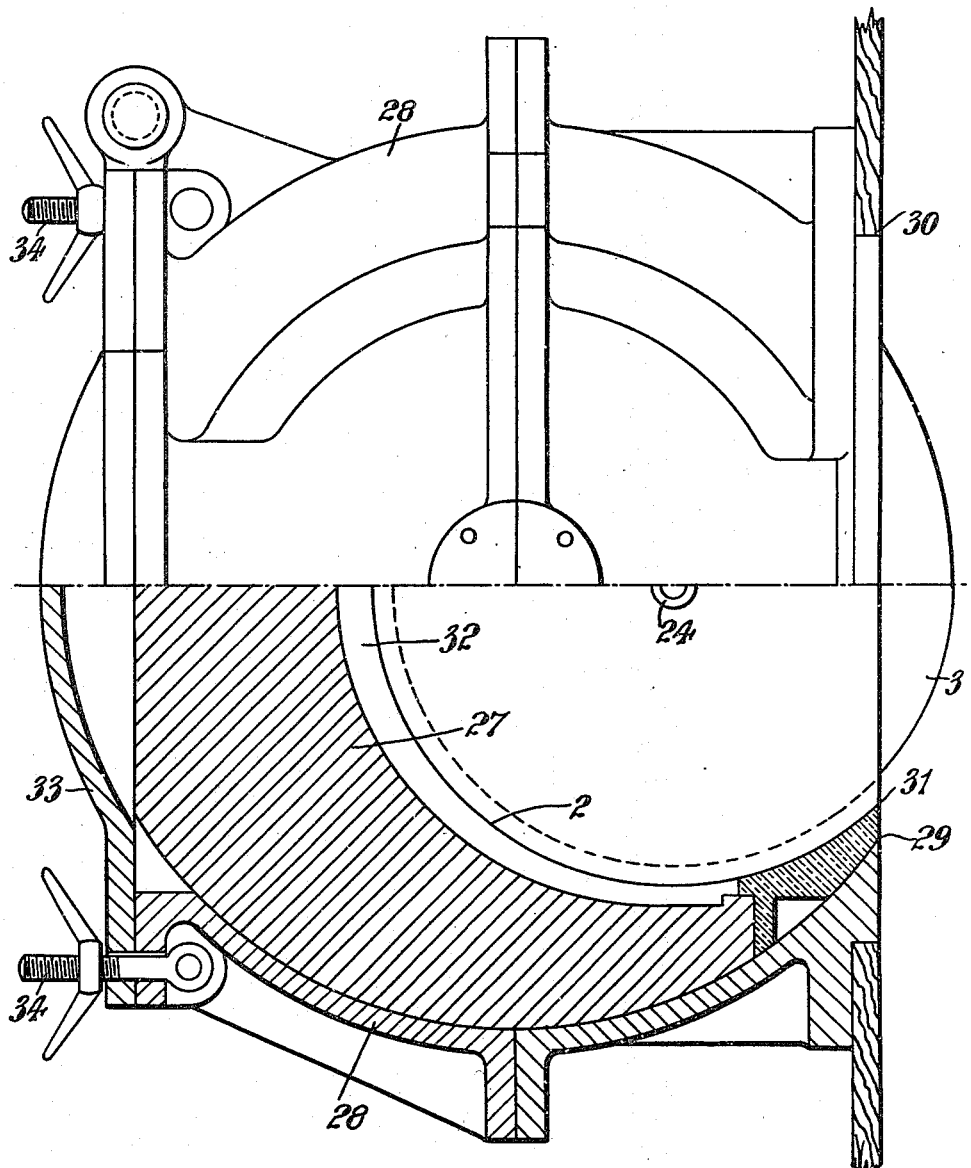
Figure 3 is a sectional view on line a—b of Fig. 1, showing a top plan view of the sound receiving apparatus mounted in a sea valve for use for marine purposes.

Referring to the drawings, the improved apparatus comprises an outer stationary casing 2, a hollow cylindrical screen 3 rotatably mounted therein, and a microphone or hydrophone 4 fixed in a stationary position inside said screen.

The casing 2, as shown in Figure 2, is cut away at one side to form an opening 5 and is closed at the bottom by means of a removable cover plate 6. The top of the casing is formed with a central boss 7 which is recessed at the underside to receive a seating 8 for a large spherical bearing member 9 which is fixed in said seating. The cover plate is also provided with a central boss 10 which is recessed in the upper side to receive a seating 11 which is screwed therein and recessed at the upper end to receive a loose ball bearing 12. The said seating 11 is locked in its adjusted position in the boss 10 by means of a nut 13 access to which can only be obtained by removing a cap 14 which screws onto the reduced outer end of said boss 10.

The peripheral wall of the hollow rotatable screen 3 may, as shown, be perforated all the way around and the perforations closed at the outside by means of a diaphragm 15 extending around the screen and indicated by a heavy line. The said screen is formed at the top with an inwardly extending central boss 16 which is recessed axially to receive a seating 17 for the spherical bearing member 9. At the bottom the screen is formed with a shallower central boss 18 which is recessed to receive a seating 19 for the loose ball 12. For convenience in manufacture and assembly the bottom of the screen is made as a separate part 20 bolted thereto. At the top and bottom the screen is formed around the whole of the periphery with vanes 21 which are accommodated in annular housings 22 formed in the top and bottom of the outer casing 2. The vanes are flush with the outer periphery of the screen and extend through the opening in the casing. Alternatively, the screen may take the form of a thin diaphragm of duralumin or other suitable material with or without reinforcements.

The microphone or hydrophone 4 is carried by a bracket 23 which is secured to the inner end of a tubular spindle 24 fixed in the upper boss 7 and bearing member 9 of the outer casing and extends downwardly through the seating 17. The said microphone is insulated by means of blocks 25 of sponge rubber or any other suitable sound insulating material from internal or from any other sound vibrations except those coming through the diaphragm opposite the microphone or hydrophone, and the electric leads 26 therefor are carried from the terminals through the tubular spindle 24 to an amplifier (not shown).

For marine purposes the apparatus above described may be conveniently housed, as shown in Figure 3, within the inner rotatable member 27 of a known and usual sea valve, the stationary outer member 28 of which has an opening 29 at one side where it is secured in known usual manner over an opening 30 in the side of the ship below the water line. The said inner member is eccentrically mounted in the outer member and has an opening 31 at one side which, when the valve is in the open position, registers with the opening 29 in the outer member thereof.

For the accommodation of the said sound receiving or transmitting apparatus the inner member 27 of the sea valve is formed at the side having the opening 31 with an eccentrically disposed internal cavity or housing 32 in which the outer casing 2 of the said apparatus is fixed with the opening 5 therein in register with the opening 31, so that when the inner member 27 is turned into the open position the opening 5 in the apparatus is in register with the openings 29 and 30 thereby exposing the protruding peripheral surface of the screen to the water. When the ship is in forward motion the action of the water on the vanes 21 causes the screen 3 to rotate in a direction such that the exposed portion is moving in the opposite direction to and at the same speed as the ship, and is, therefore, relatively stationary, thereby eliminating any interference with the reception or transmission of sound waves from or to a distant source or point, which would otherwise be set up as the result of the turbulence caused by the movement of the ship.

When the apparatus is not required for active use the sea valve may be closed by turning the inner member 27 thereof into a position to close the opening 30 in the side of the ship. This will bring the sound receiving or transmitting apparatus into a position facing the back of the valve where the fixed outer casing 28 is provided with a hinged cover plate 33 normally secured in the closed position by means of bolts 34. Access to the apparatus in this position can be obtained by opening the cover plate.

A complete equipment for marine purposes is indicated diagrammatically in Figure 4 in which R, $R^1$ represent the two sets of apparatus, one at each side of the ship, see Figure 5.

For reception purposes the sound waves received by the hydrophone 4 are converted in the orthodox manner into electrical impulses which are conducted to amplifying units A, $A^1$. The degree of amplification can be adjusted by gain controls $GC^1$ and $GC^2$ of any suitable kind. The incoming sound waves can be balanced against those produced locally, by means of a known kind of balance control BC. Once a balance is established any difference in the strength of the incoming sound waves can be transferred by means of a rotary switch RS, to all or any of the following instruments, viz.: a galvanometer G, cathode ray oscillograph CRO, galvanometer mirror GM, recording instrument X, headphones or other suitable form of listening apparatus H, or any combination of such devices. Instruments G, GM, X and H can be arranged to record on a meter or series of meters while the cathode ray oscillograph will show a deflection of light on a screen and may be used to operate other mechanisms as is also the case with the galvanometer G.

When using two sets of apparatus as shown direction right and left is obtained by manipulating the balance control units $GC^1$ and $GC^2$, and position fore and aft is determined by angular adjustment of the hydrophone 4. Alternatively, the ship may be steered right and left so as to constitute a screen between the two sets of apparatus. To obtain distance as well as direction three or more sets of apparatus can be used and thrown out of phase with each other.

When employed on aircraft the two sets of apparatus R, $R^1$ may be mounted at the ends of the wings 35 as shown in Figure 6, or they may be mounted in streamline casings attached below the wings, on the under-carriage, or in any other suitable position. In any case the operation and function of the units will be the same as for marine use except that in this case the screens will be rotated by the action of the air on the vanes at the same speed and in the same direction as the air stream thereby eliminating all noises which would otherwise be produced by the latter.

For transmission purposes the equipment employed may be as represented diagrammatically in Figure 7 where T represents a tapping key, sub-sonic, sonic or supersonic oscillator, sound record voice or other means of producing sounds or signals, $A^2$ indicates an amplifier and $ST^1$ and $ST^2$ the two sets of sound transmitting apparatus which constructionally will be similar to that above described for reception.

The screen or diaphragm 3 may be driven at the requisite speed and in the desired direction by any suitable means and instead of using vanes 21 exposed to the action of the fluid medium the screen may be driven in any independent manner, as by means of a variable speed electric motor.

I claim:

1. Apparatus for receiving and transmitting sound waves to and from an object between which and a surrounding fluid medium there is relative movement, comprising a stationary enclosed casing adapted for mounting on said object and having an opening at one side, at least one normally stationary sound responsive device mounted within said casing opposite the opening therein, a screen arranged between said device and said opening, and means controlled by the relative speed of movement between said object and said fluid for moving said screen relative to said device and opening at substantially the same speed as said speed of movement between said object and said fluid but in a direction opposite to said movement, whereby most noises which otherwise would be produced by the relative movement between said object and said fluid will be eliminated.

2. Apparatus for receiving and transmitting sound waves to and from an object between which and a surrounding fluid medium there is relative movement, comprising a stationary enclosed casing adapted for mounting on said object and having an opening at one side, at least one normally stationary sound responsive device mounted within said casing opposite the opening therein, means for giving said device a limited angular adjustment relatively to said opening, a rotary screen arranged between said device and said opening, and fan blades associated with said diaphragm and exposed to the action of said fluid medium to thereby rotate said screen.

3. Sound receiving and transmitting apparatus for marine purposes comprising a sea valve having an opening exposed below the water line, an enclosed casing arranged within said sea valve and having an opening at one side normally registering with the opening in said sea valve, at least one sound responsive device mounted within said casing opposite the opening therein, a rotary screen arranged between said device and said openings, and impeller blades carried by said screen and exposed to the action of the sea through said openings to rotate said screen at a definite speed relative to the speed of movement between said sea valve and water and in a direction opposite to the direction of movement between said sea valve and water.

4. Apparatus for receiving and transmitting sound waves to and from an object between which and a surrounding fluid medium there is relative movement, comprising a stationary enclosed casing adapted for mounting on said object and having an opening at one side, at least one normally stationary sound responsive device mounted within said casing opposite the opening therein, a screen arranged between said device and said opening, means for moving said screen relatively to said device and opening at substantially the same speed as the speed of relative movement between said object and fluid but in a direction opposite to said movement, whereby most noises which otherwise would be produced by the relative movement between said object and said fluid will be eliminated.

5. Apparatus for receiving and transmitting sound waves to and from an object between which and a surrounding fluid medium there is relative movement, comprising a stationary enclosed casing adapted for mounting on said object and having an opening at one side, at least one normally stationary sound responsive device mounted within said casing opposite the opening therein, means for insulating said sound responsive devices from any noises produced within said casing, a screen arranged between said device and said opening, and means for moving said screen relatively to said device and opening at substantially the same speed as the speed of the relative movement between said object and fluid but in a direction opposite to said movement, whereby most noises which otherwise would be produced by the relative movement between said object and said fluid will be eliminated.

6. Apparatus for receiving and transmitting sound waves to and from an object between which and a surrounding fluid medium there is relative movement, comprising a stationary enclosed casing adapted for mounting on said object and having an opening at one side, at least one normally stationary sound responsive device mounted within said casing opposite the opening therein, means for giving said device a limited angular adjustment relatively to said opening, blocks of sponge rubber arranged about said sound responsive device within said casing, a screen arranged between said device and said opening, and means for moving said screen relatively to said device and opening at substantially the same speed as the speed of the relative movement between said object and fluid but in a direction opposite to said movement, whereby most noises which otherwise would be produced by the relative movement between said object and said fluid will be eliminated.

THOMAS JOHN ROBERT BRIGHT.